(12) United States Patent
Ge et al.

(10) Patent No.: US 11,734,844 B2
(45) Date of Patent: Aug. 22, 2023

(54) 3D HAND SHAPE AND POSE ESTIMATION

(71) Applicant: Snap Inc., Santa Monica, CA (US)

(72) Inventors: Liuhao Ge, Venice, CA (US); Zhou Ren, Bellevue, WA (US); Yuncheng Li, Los Angeles, CA (US); Zehao Xue, Los Angeles, CA (US); Yingying Wang, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/823,764

(22) Filed: Aug. 31, 2022

(65) Prior Publication Data
US 2022/0414985 A1    Dec. 29, 2022

Related U.S. Application Data

(63) Continuation of application No. 17/222,176, filed on Apr. 5, 2021, now Pat. No. 11,468,636, which is a
(Continued)

(51) Int. Cl.
G06T 17/20      (2006.01)
G06T 7/50       (2017.01)
(Continued)

(52) U.S. Cl.
CPC .............. G06T 7/50 (2017.01); G06N 3/045 (2023.01); G06N 3/08 (2013.01); G06T 7/75 (2017.01);
(Continued)

(58) Field of Classification Search
None
See application file for complete search history.

(56) References Cited

U.S. PATENT DOCUMENTS 7,971,156 B2    6/2011   Albertson et al.
7,996,793 B2    8/2011   Latta et al.
(Continued)

FOREIGN PATENT DOCUMENTS

CN    103049761    8/2016
EP      3707693    9/2020
(Continued)

OTHER PUBLICATIONS

"U.S. Appl. No. 16/210,927, Non Final Office Action dated Mar. 16, 2020", 15 pgs.
(Continued)

Primary Examiner — Nicholas R Wilson
(74) Attorney, Agent, or Firm — Schwegman Lundberg & Woessner, P.A.

(57) ABSTRACT

Aspects of the present disclosure involve a system comprising a computer-readable storage medium storing a program and a method for receiving a monocular image that includes a depiction of a hand and extracting features of the monocular image using a plurality of machine learning techniques. The program and method further include modeling, based on the extracted features, a pose of the hand depicted in the monocular image by adjusting skeletal joint positions of a three-dimensional (3D) hand mesh using a trained graph convolutional neural network (CNN); modeling, based on the extracted features, a shape of the hand in the monocular image by adjusting blend shape values of the 3D hand mesh representing surface features of the hand depicted in the monocular image using the trained graph CNN; and generating, for display, the 3D hand mesh adjusted to model the pose and shape of the hand depicted in the monocular image.

20 Claims, 10 Drawing Sheets

Related U.S. Application Data continuation of application No. 17/010,256, filed on Sep. 2, 2020, now Pat. No. 10,997,787, which is a continuation of application No. 16/210,927, filed on Dec. 5, 2018, now Pat. No. 10,796,482.

(51) Int. Cl.
  *G06T 7/73* (2017.01)
  *G06N 3/08* (2023.01)
  *G06N 3/045* (2023.01)
  *G06V 10/774* (2022.01)
  *G06V 10/82* (2022.01)
  *G06V 40/10* (2022.01)

(52) U.S. Cl.
  CPC ............ *G06T 17/20* (2013.01); *G06V 10/774* (2022.01); *G06V 10/82* (2022.01); *G06V 40/107* (2022.01); *G06T 2207/10004* (2013.01)

(56) References Cited

U.S. PATENT DOCUMENTS

| | | |
|---|---|---|
| 8,487,938 B2 | 7/2013 | Latta et al. |
| 8,856,691 B2 | 10/2014 | Geisner et al. |
| 9,225,897 B1 | 12/2015 | Sehn |
| 9,230,160 B1 | 1/2016 | Kanter |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,796,482 B2 | 10/2020 | Ge et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan et al. |
| 11,307,747 B2 | 4/2022 | Dancie et al. |
| 11,468,636 B2 | 10/2022 | Ge et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2011/0301934 A1 | 12/2011 | Tardif |
| 2014/0171036 A1 | 6/2014 | Simmons |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2020/0184721 A1 | 6/2020 | Ge et al. |
| 2020/0402305 A1 | 12/2020 | Ge et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0225077 A1 | 7/2021 | Ge et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |

FOREIGN PATENT DOCUMENTS

| | | |
|---|---|---|
| KR | 20220158824 A | 12/2022 |
| WO | 2016168591 | 10/2016 |
| WO | 2019094618 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 16/210,927, Notice of Allowance dated Jun. 4, 2020", 5 pgs.

"U.S. Appl. No. 16/210,927, Response filed May 20, 2020 to Non Final Office Action dated Mar. 16, 2020", 9 pgs.

"U.S. Appl. No. 17/010,256, Non Final Office Action dated Sep. 28, 2020", 10 pgs.

"U.S. Appl. No. 17/010,256, Notice of Allowance dated Dec. 30, 2020", 5 pgs.

"U.S. Appl. No. 17/010,256, Response filed Dec. 10, 2020 to Non Final Office Action dated Sep. 28, 2020", 8 pgs.

"U.S. Appl. No. 17/222,176, Non Final Office Action dated Feb. 17, 2022", 18 pgs.

"U.S. Appl. No. 17/222,176, Notice of Allowance dated Jun. 1, 2022", 5 pgs.

"U.S. Appl. No. 17/222,176, Response filed May 17, 2022 to Non Final Office Action dated Feb. 17, 2022", 10 pgs.

Cai, Yujun, et al., "Weakly-supervised 3D Hand Pose Estimation from Monocular RGB Images", Proceedings of the European Conference on Computer Vision (ECCV), (2018), 17 pgs.

Edwards, Michael, "Graph Based Convolutional Neural Network", arXiv:1609.08965v1 [cs.CV], (Sep. 28, 2016), 11 pgs.

Ge, Liuhao, et al., "Robust 3D Hand Pose Estimation in Single Depth Images: from Single-View CNN to Multi-View CNNs", Proceedings of the IEEE Conference on Computer Vision and Pattern Recognition (CVPR), (2016), 9 pgs.

Iqbal, et al., "Hand Pose Estimation via Latent 2.5D Heatmap Regression", (Apr. 25, 2018).

Newell, et al., "Stacked Hourglass Networks for Human Pose Estimation", arXiv:1603.06937v2 [cs.CV], (Jul. 26, 2016), 17 pgs.

Romero, et al., "Embodied Hands—Modeling and Capturing Hands and Bodies Together", ACM, (2017).

3D HAND SHAPE AND POSE ESTIMATION

CROSS REFERENCE TO RELATED APPLICATIONS

This application is a continuation of U.S. patent application Ser. No. 17/222,176, filed on Apr. 5, 2021, which is a continuation of U.S. patent application Ser. No. 17/010,256, filed on Sep. 2, 2020, now issued as U.S. Pat. No. 10,997,787, which is a continuation of U.S. patent application Ser. No. 16/210,927, filed on Dec. 5, 2018, now issued as U.S. Pat. No. 10,796,482, each of which are incorporated herein by reference in their entireties.

TECHNICAL FIELD

The present disclosure relates generally to generating a three-dimensional (3D) model of a hand and more particularly to estimating a hand shape and pose for generating a 3D model using machine learning.

BACKGROUND

The popularity of virtual reality (VR) and augmented reality (AR) applications continues to grow, and vision-based 3D hand analysis is very important in this growing field. Particularly, these applications generally present an animated model of a hand in VR or AR which represents the user's hand in the real world. The user interacts with VR or AR content using the animated model of the hand. In order to allow the user to accurately position the animated model of the hand within the VR or AR application to interact with the VR or AR content, estimations of the real-world hand have to be performed accurately and quickly.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
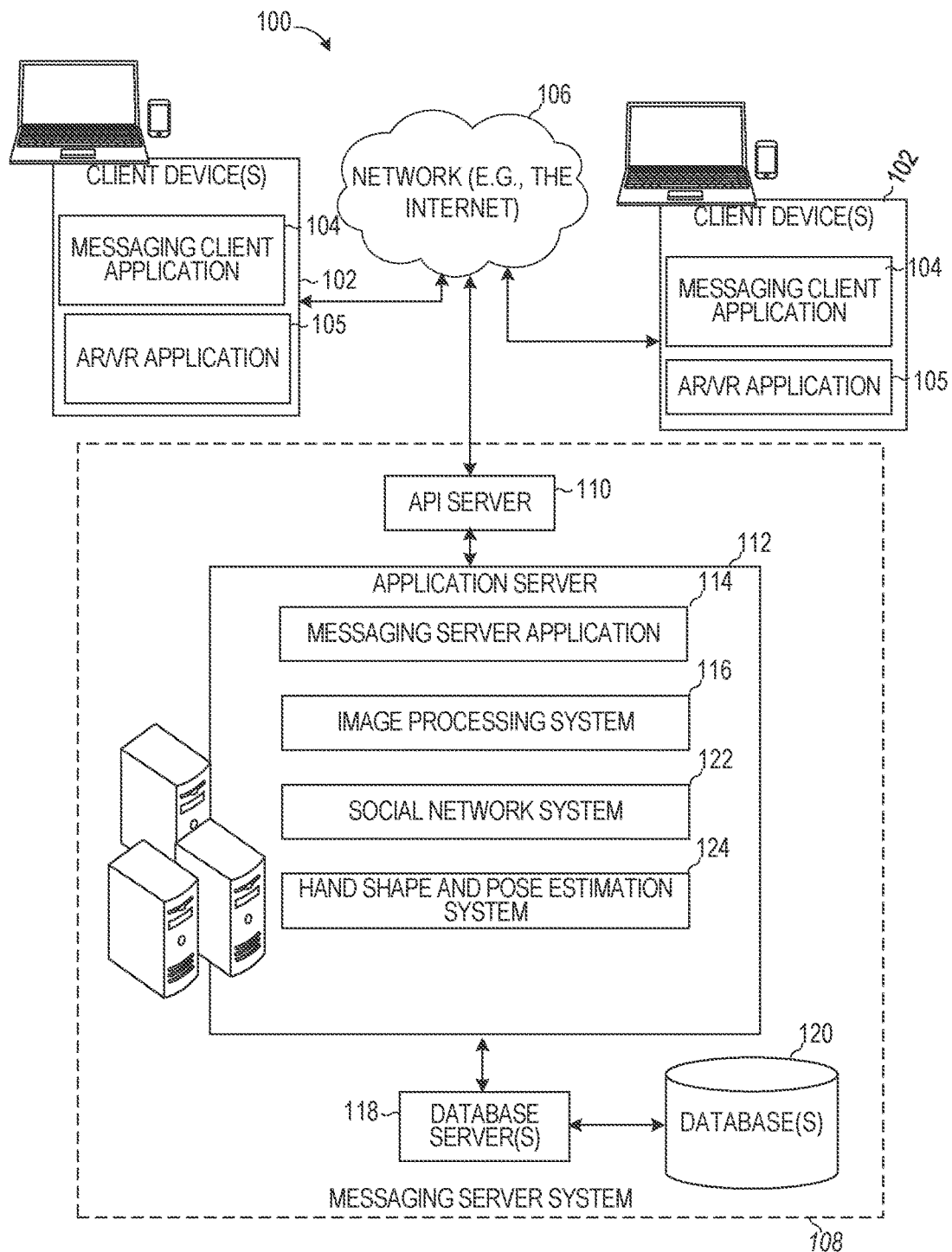
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, VR and AR systems display a 3D hand representation of a real-world user's hand by focusing on sparse 3D hand joint locations and ignore dense 3D hand shapes. Specifically, these systems capture an image using a red, green, blue (RGB) camera and determine the joint positions of the hand from the image. Given the diversity and complexity of real-world hand shapes, such typical systems simply obtain a generic 3D hand model and use the determined joint positions to fit the obtained generic hand model to resemble the joint positions (e.g., the finger positions) of the real-world hand. Such generic representations of the hand fail to consider the shape of the hand and other surface features of the hand, so the 3D hand model that is presented is not very accurate. This makes user interactions with content in the VR and AR systems more difficult and less realistic, which detracts from the overall user experience.

Some conventional systems improve the accuracy of the 3D hand model by obtaining a depth map using a depth sensor in addition to the RGB image of the real-world hand. Particularly, such systems fit a deformable hand model to the input depth map with iterative optimizations. The pose and shape parameters are obtained from the depth map using neural networks (e.g., a convolutional neural network (CNN)) and a 3D hand mesh is recovered using a model. However, in such systems, the quality of the recovered hand mesh is restricted by the parameters of the model, meaning the generated 3D hand is not an entirely accurate representation of the user's hand. Also, adding depth sensors to user devices increases the overall cost and complexity of the devices, making them less attractive.

The disclosed embodiments improve the efficiency of using the electronic device by applying machine learning techniques, including a graph CNN, to generate a 3D hand mesh for presentation in a VR or AR application. The 3D hand mesh is generated directly from a single RGB image depicting a real-world hand and represents the pose (e.g., joint locations) and shape (e.g., surface features) of the hand that is depicted in the RGB image. The disclosed embodiments generate the 3D hand mesh without also obtaining a depth map of the real-world hand. Specifically, according to the disclosed techniques, image features of a single RGB image are extracted by one or more machine learning techniques and then graph convolutions (e.g., using a graph CNN) are applied hierarchically with upsampling and nonlinear activations to generate 3D hand mesh vertices. According to the disclosed embodiments, the generated 3D hand mesh can better represent highly variable 3D hand shapes (e.g., surface features) and their local details. This enables a user device with a simple RGB camera (without a depth camera) to accurately and quickly render an animated 3D hand model of the real-world user's hand within the VR or AR application, allowing the user to interact with the VR or AR content in a more realistic environment.

In some embodiments, the machine learning techniques generate the 3D hand mesh directly from a single RGB image of the real-world hand after being trained in two training phases. In a first of the two training phases, the machine learning techniques are trained using a synthetic dataset (e.g., animations of a hand) that include various ground truth 3D hand information. In a second of the two training phases, the machine learning techniques are trained using an RGB image depicting a real-world hand and a corresponding depth map together with a pseudo-3D hand mesh generated by the machine learning techniques trained in the first training phase. After being trained in the two training phases, the machine learning techniques can generate the 3D hand mesh of the hand depicted in an RGB image received from a user device without obtaining depth information.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a AR/VR application 105. Each messaging client application 104 is communicatively coupled to other instances of the messaging client application 104, the AR/VR application 105, and a messaging server system 108 via a network 106 (e.g., the Internet).

Accordingly, each messaging client application 104 and AR/VR application 105 is able to communicate and exchange data with another messaging client application 104 and AR/VR application 105 and with the messaging server system 108 via the network 106. The data exchanged between messaging client applications 104, AR/VR applications 105, and between a messaging client application 104 and the messaging server system 108, includes functions (e.g., commands to invoke functions) as well as payload data (e.g., text, audio, video, or other multimedia data).

AR/VR application 105 is an application that includes a set of functions that allow the client device 102 to access hand shape and pose estimation system 124. In some implementations, the AR/VR application 105 is a component or a feature that is part of the messaging client application 104. AR/VR application 105 uses an RGB camera to capture a monocular image of a user's real-world hand. The AR/VR application 105 applies various trained machine learning techniques on the captured image of the hand to generate a 3D hand model representation of the hand that includes the pose (e.g., the joint positions) and the shape (e.g., the surface features and textures) of the hand. In some implementations, the AR/VR application 105 continuously captures images of the user's hand in real-time or periodically to continuously or periodically update the generated 3D hand model representation. The allows the user to move the hand around in the real world and see the 3D hand model update in real time to represent the user's hand moving around in the AR or VR environment. The AR/VR application 105 presents various content (e.g., messages, games, advertisements, and so forth) and allows the user to position the 3D hand model in the AR/VR application 105 over the content that is presented by moving the user's hand in the real world. Once the 3D hand model is positioned at a desired location, the user can perform an action or gesture to make a selection of the content over which the hand is positioned.

In order for AR/VR application 105 to generate the 3D hand model directly from a captured RGB image, the AR/VR application 105 obtains one or more trained machine learning techniques from the hand shape and pose estimation system 124 and/or messaging server system 108. Hand shape and pose estimation system 124 trains the machine learning techniques to generate the 3D hand model in two training phases. In the first training phase, the hand shape and pose estimation system 124 obtains a first plurality of input images that include synthetic representations of a hand. These synthetic representations include a depiction of an animated hand and also provide the ground truth information about the shape and pose of the animated hand (e.g., a 3D mesh and 3D pose ground truth information). A first machine learning technique (e.g., a two-stacked hourglass network) is initially trained based on a first feature (e.g., a heat-map loss) of the first plurality of images. A second machine learning technique (e.g., a 3D pose regressor network) is initially trained, separately from the first machine learning technique, based on a second feature (e.g., a 3D pose loss) of the first plurality of images. The first and second machine learning techniques are then trained together with a graph CNN based on the first plurality of images with the combined mesh, pose and heat-map losses. In the second training phase, a second plurality of input images are obtained that include real-world depictions of a hand and reference 3D depth maps captured using a depth camera or sensor. A pseudo-ground truth mesh of the real-world depictions of the hand is generated using the graph CNN trained in the first training phase. The first and second machine learning techniques are then trained together with the graph CNN based on the pseudo-ground truth mesh, the real-world depictions of the hand, and the reference 3D depth maps. In some implementations, in the second training phase, the first machine learning technique (e.g., the stacked hourglass network) is first trained with the first feature of the second plurality of images (e.g., the heat-map loss) and then all the machine learning techniques are trained or fine-tuned based on a heat-map loss, a depth loss, and a mesh loss.

For example, the input RGB image depicting a computer-generated hand pose is passed through a two-stacked hourglass network for 2D hand pose estimation. The estimated 2D heat maps, combined with the image feature maps, are encoded as latent feature vectors by a residual network. The latent feature vector is then input to a graph CNN to infer the 3D coordinates of the mesh vertices. Finally, the 3D hand pose is linearly regressed from the 3D hand mesh. Specifically, the machine learning techniques are initially trained on the synthetic dataset in a fully supervised manner with heat-map loss, 3D mesh loss, and 3D pose loss. The machine learning techniques are then optimized using real-world datasets that include a depth map without 3D mesh or 3D pose ground truth information. Particularly, the networks are fine-tuned in a weakly-supervised manner by rendering the full 3D hand mesh to a depth map and minimizing the depth map loss against the reference depth map. These processes are described in more detail below in connection with FIGS. 6 and 7.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the hand shape and pose estimation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the hand shape and pose estimation system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
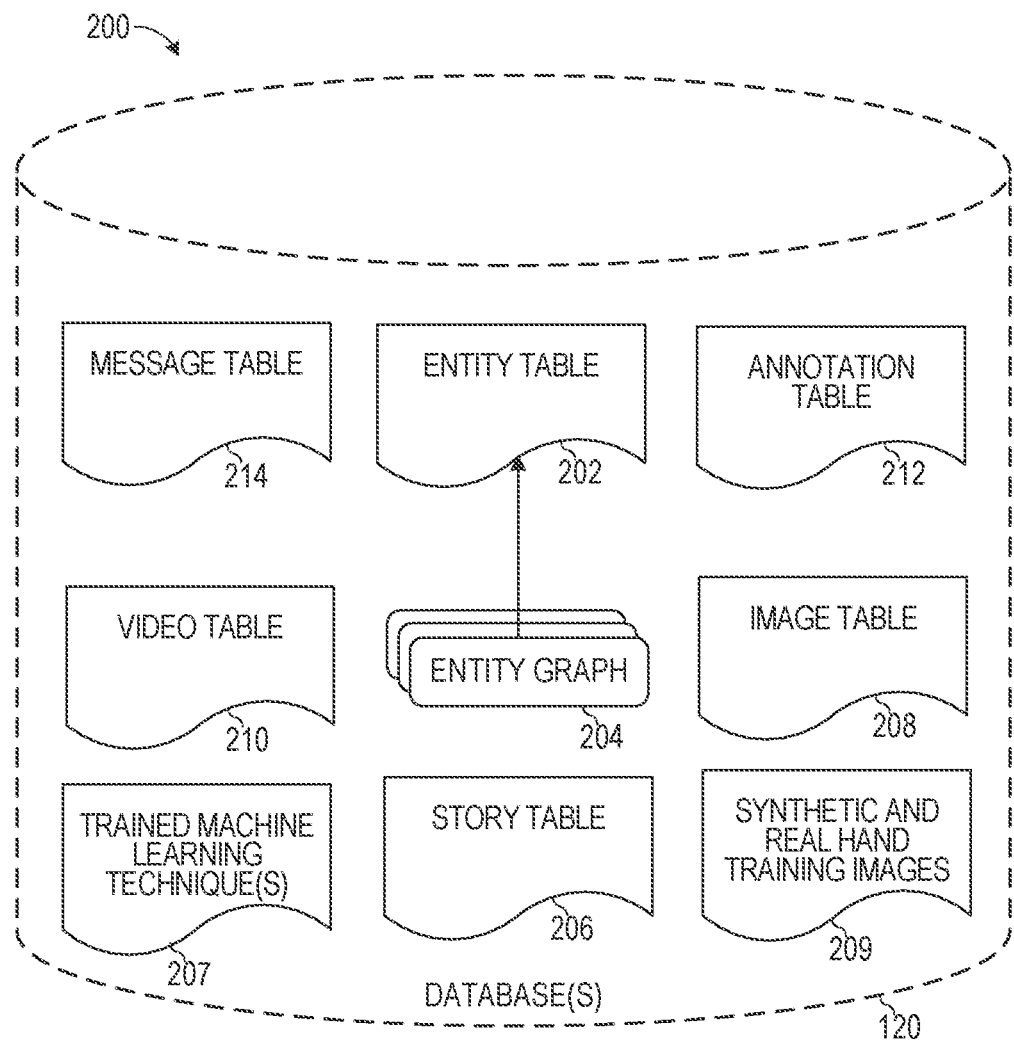
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trained machine learning technique(s) 207 stores parameters that have been trained in the first and second training phases of the hand shape and pose estimation system 124. For example, trained machine learning techniques 207 stores the trained parameters of a stacked hourglass network, a residual network, a graph CNN, a 3D pose regressor, and mesh renderer machine learning techniques.

Synthetic and real hand training images 209 stores a first plurality of images of depictions of a computer-generated hand and a second plurality of depictions of real-world hands. The first plurality of images stored in the synthetic and real hand training images 209 includes various ground truth information (e.g., 3D pose, 3D mesh and/or shape ground truth information) for each image in the first plurality of images. This first plurality of images is used by the hand shape and pose estimation system 124 in a first training phase to train the machine learning techniques. The second plurality of images stored in the synthetic and real hand training images 209 includes various depictions of a real-world hand together with 3D depth information captured from a 3D depth sensor for each image in the second plurality of images. This second plurality of images is used by the hand shape and pose estimation system 124 in a second training phase to train the machine learning techniques.

In some implementations, the first plurality of images (also referred to as synthetic images), stored in synthetic and real hand training images 209, provides the labels of both 3D hand joint locations and full 3D hand meshes. A 3D hand model is generated, rigged with joints, and then photorealistic textures are applied on the 3D hand model as well as natural lighting using high-dynamic range (HDR) images. The variations of the hand are modeled by creating blend shapes with different shapes and ratios, and then random weights are applied to the blend shapes. Hand poses from 500 common hand gestures and 1000 unique camera viewpoints are created and captured in the first plurality of images. To simulate real-world diversity, 30 lightings and five skin colors are used. The hand is rendered using global illumination. In some implementations, the first plurality of images includes 375,000 hand RGB images with large variations. In some embodiments, only a portion (e.g., 315,000) of the first plurality of images are used in the first training phase to train the machine learning techniques. During training or before, each rendered hand in the first plurality of images is cropped from the image and blended with a randomly selected background image (e.g., a city image, a living room image, or any other suitable image obtained randomly or pseudo-randomly from a background image server(s)). To do this, the system obtains an image that contains a rendered 3D hand mesh, the 3D hand mesh is cropped and extracted from the image, a background image is randomly selected, and the cropped 3D hand mesh is combined with the selected background image and stored as a new image to be used in the first training phase. Particularly, the first plurality of images used to train the machine learning techniques in the first training phase is modified to include a variety of simulated or computer-generated hand models overlaid on top of or blended with a background image to provide a more realistic representation.

In some implementations, the second plurality of images, stored in synthetic and real hand training images 209, includes hand RGB images with the corresponding depth images of each RGB image captured using a RGB-D camera (e.g., an RGB camera fitted with a depth sensor or depth camera).

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
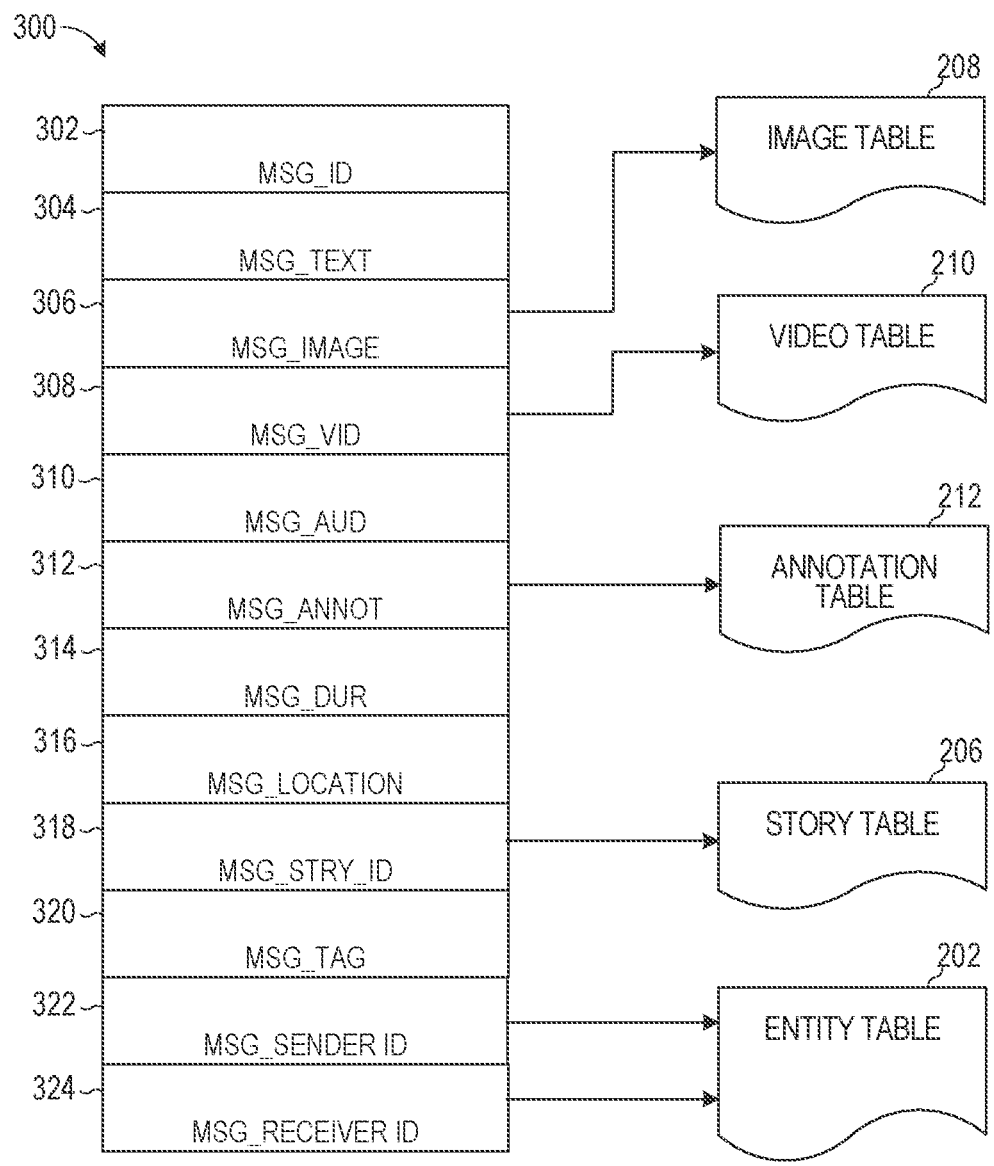
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- A message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
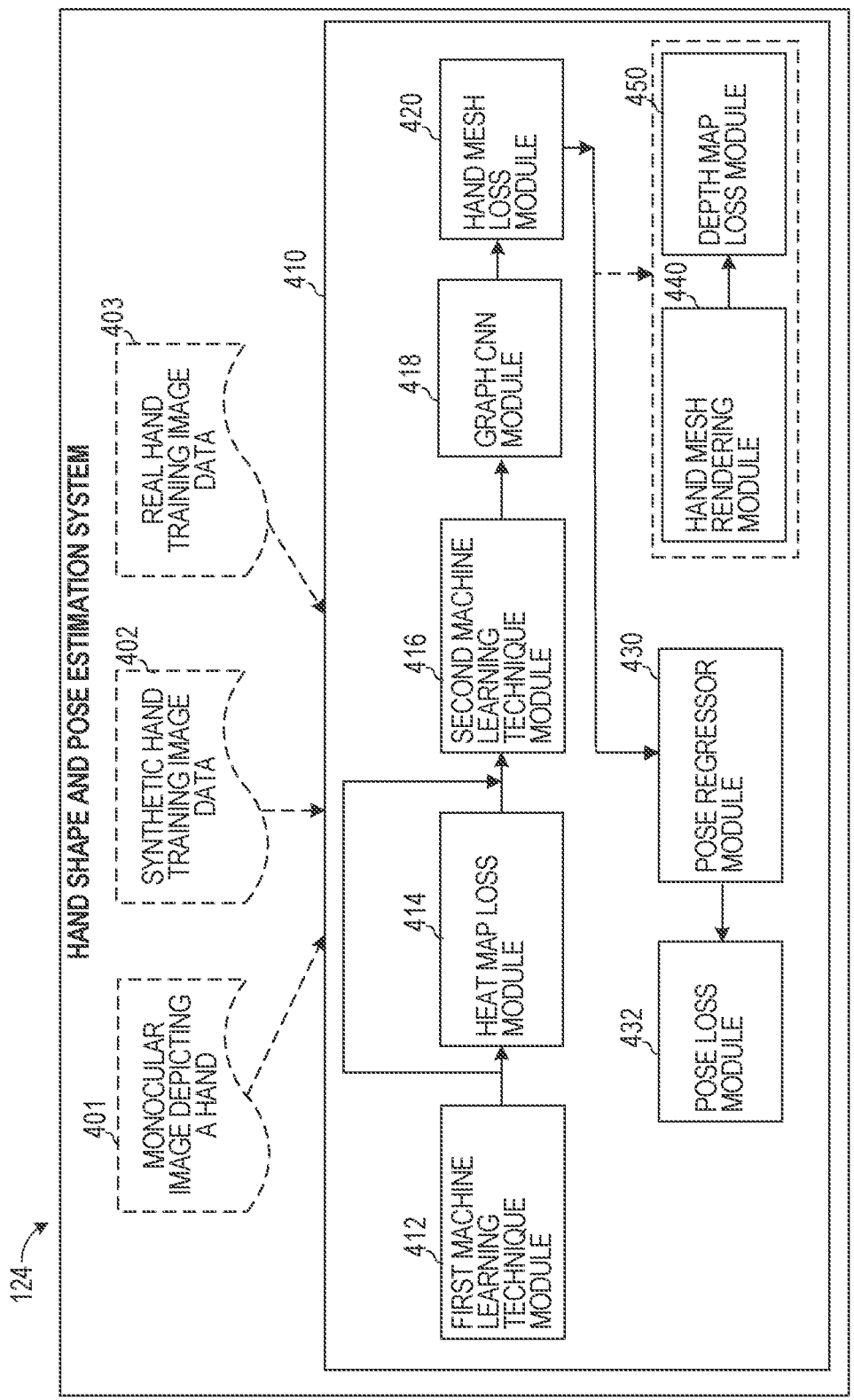
FIG. 4 is a block diagram showing an example hand shape and pose estimation system, according to example embodiments.

FIG. 4 is a block diagram showing an example hand shape and pose estimation system 124, according to example embodiments. Hand shape and pose estimation system 124 operates on a set of input data (e.g., monocular image depicting a real-world hand 401, synthetic hand training image data 402, and real-world hand training image data 403). The set of input data is obtained from synthetic and real hand training images 209 stored in database(s) 200 during the training phases and is obtained from an RGB camera of a client device 102 when a AR/VR application 105 is being used. Hand shape and pose estimation system 124 includes a first machine learning technique module 412, a heat map loss module 414, a second machine learning technique module 416, a graph CNN module 418, a hand mesh loss module 420, a pose regressor module 430, pose loss module 432, a hand mesh rendering module 440, and a depth map loss module 450.

In general, according to the disclosed embodiments, hand shape and pose estimation system 124 receives an input image (e.g., monocular image depicting a real-world hand 401) as a single RGB image centered on a hand. This image is passed through a two-stacked hourglass network to infer 2D heat-maps. The estimated 2D heat-maps, combined with image feature maps, are encoded as a latent feature vector using a residual network that contains eight residual layers and four max pooling layers. The encoded latent feature vector is then input to a graph CNN to infer the 3D coordinates of N vertices $\mathcal{V}=\{v_i\}_{i=1}^{N}$ in the 3D hand mesh. The 3D hand joint locations $\Phi=\{\phi_j\}_{j=1}^{J}$ are linearly regressed from the reconstructed 3D hand mesh vertices by using a simplified linear graph CNN.

In some implementations, the first machine learning technique module 412 includes a stacked hourglass network. The stacked hourglass network is trained to capture and consolidate information across all scales of an image. The network pools pixels of the image and subsequently upsamples the image to get the final output. Specifically, the hourglass network pools down the image to a very low resolution, then upsamples and combines features across multiple resolutions. Multiple hourglass modules can be strung together or stacked, allowing for repeated bottom-up, top-down inference across scales. In some embodiments, a two-stacked hourglass network is used as the first machine learning technique module 412.

The first machine learning technique module 412 is configured to estimate a heat map based on the input image. The first machine learning technique module 412 provides the generated heat map to the heat map loss module 414 to compute a heat map loss with respect to the ground truth heat map (in training) or a precomputed and pretrained coefficient. The first machine learning technique module 412 is trained in a training phase based on the output of the heat map loss module 414. In an implementation, the heat map loss module 414 computes the heat-map loss in accordance with the function:

$$\mathcal{L}_\mathcal{H} = \sum_{j=1}^{J} \|\mathcal{H}_j - \hat{\mathcal{H}}_j\|_2^2, \quad (1)$$

where $H_j$ and $\hat{\mathcal{H}}_j$ are the ground truth and estimated heat-maps, respectively. In an embodiment, the heat-map resolution is set as 64×64 pixels. The ground truth heat-map is defined as a 2D Gaussian with a standard deviation of 4 pixels centered on the ground truth 2D joint location.

In some implementations, the second machine learning technique module 416 includes a residual network (a type of artificial neural network). In an implementation, the residual network contains eight residual layers and four max pooling layers. The residual network can be trained using residual learning implemented to every few stacked layers. As an example, formulation (1) can be defined as:

$$F(x)=W2\sigma(W1x)+x \quad (2)$$

where W1 and W2 are the weights for the convolutional layers and σ is the activation function. The operation F+x is realized by a shortcut connection and element-wise addition. The addition is followed by an activation function σ. The resulting formulation for a residual block is:

$$y(x)=\sigma(W2\sigma(W1x)+x). \quad (3)$$

After each convolution (weight) layer, a batch normalization method (BN) is adopted. The training of the network is achieved by stochastic gradient descent (SGD) with a mini-batch size of 256. The learning rate starts from 0.1 and is divided by 10 when the error plateaus. The weight decay rate is 0.0001 and has a value of 0.9.

The output of the second machine learning technique module 416 encodes the estimated 2D heat maps from the first machine learning technique module 412 and the image feature maps as a latent feature vector. This latent feature vector is provided to the graph CNN module 418.

Graph CNN module 418 implements a CNN specifically designed to operate on a graph-based vector of information. Generally, CNN is a type of feed-forward artificial neural network where the individual neurons are tiled in such a way that they respond to overlapping regions in the visual field. CNNs consist of multiple layers of small neuron collections, which look at small portions of the input image, called receptive fields. The results of these collections are then tiled so that they overlap to obtain a better representation of the original image; this is repeated for every such layer. Convolutional networks may include local or global pooling layers, which combine the outputs of neuron clusters. They also consist of various combinations of convolutional layers and fully connected layers, with pointwise nonlinearity applied at the end of or after each layer. To avoid the situation that there exist billions of parameters if all layers are fully connected, the idea of using a convolution operation on small regions has been introduced. One major benefit of convolutional networks is the use of shared weight in convolutional layers, which means that the same filter (weights bank) is used for each pixel in the layer; this both reduces required memory size and improves performance.

SVMs are supervised learning models with associated learning algorithms that are configured to recognize patterns. Given a set of training examples, with each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall on.

Figure 5:
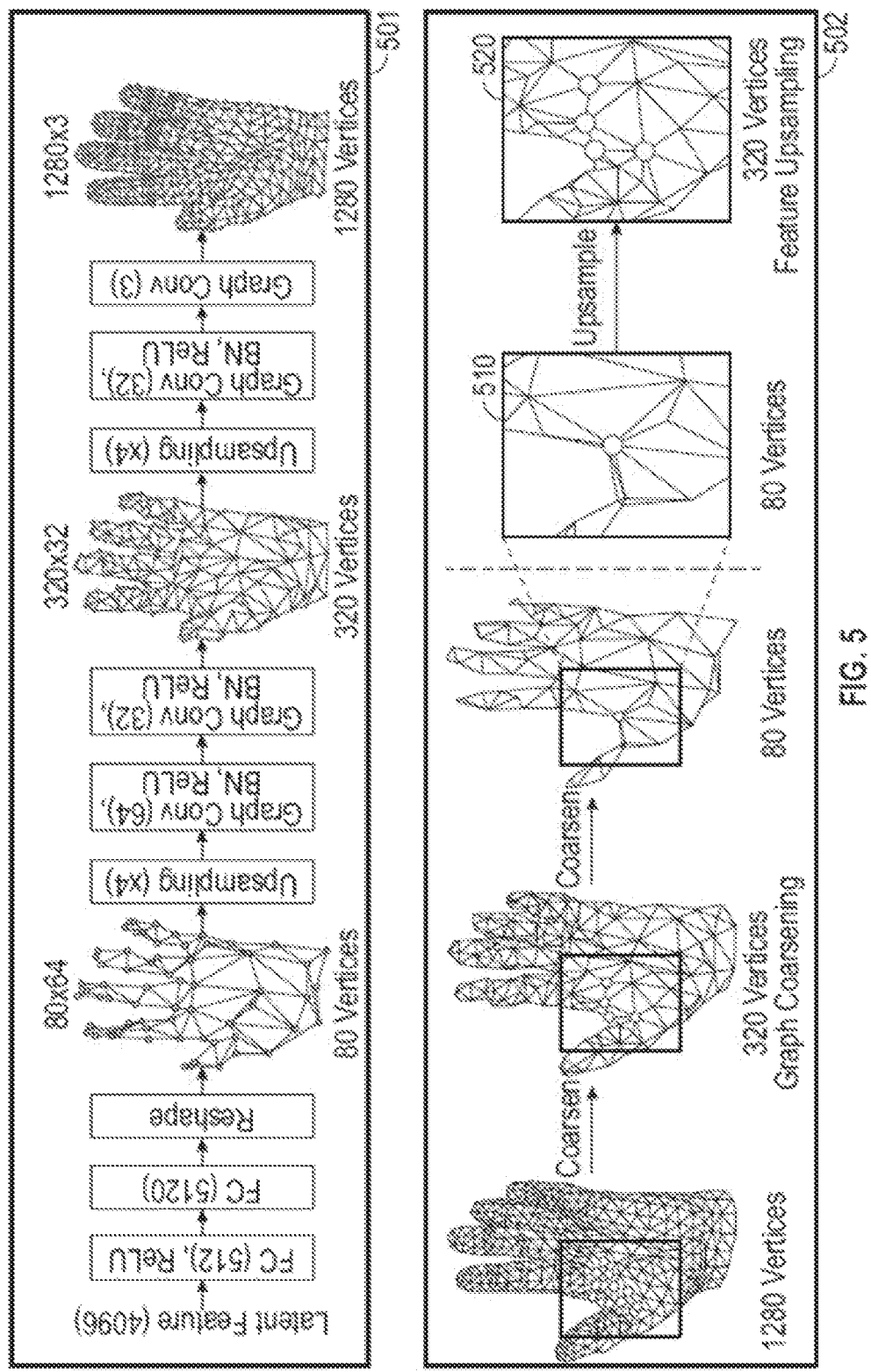
FIG. 5 is a block diagram showing a 3D hand mesh generation process, according to example embodiments.
Figure 8:
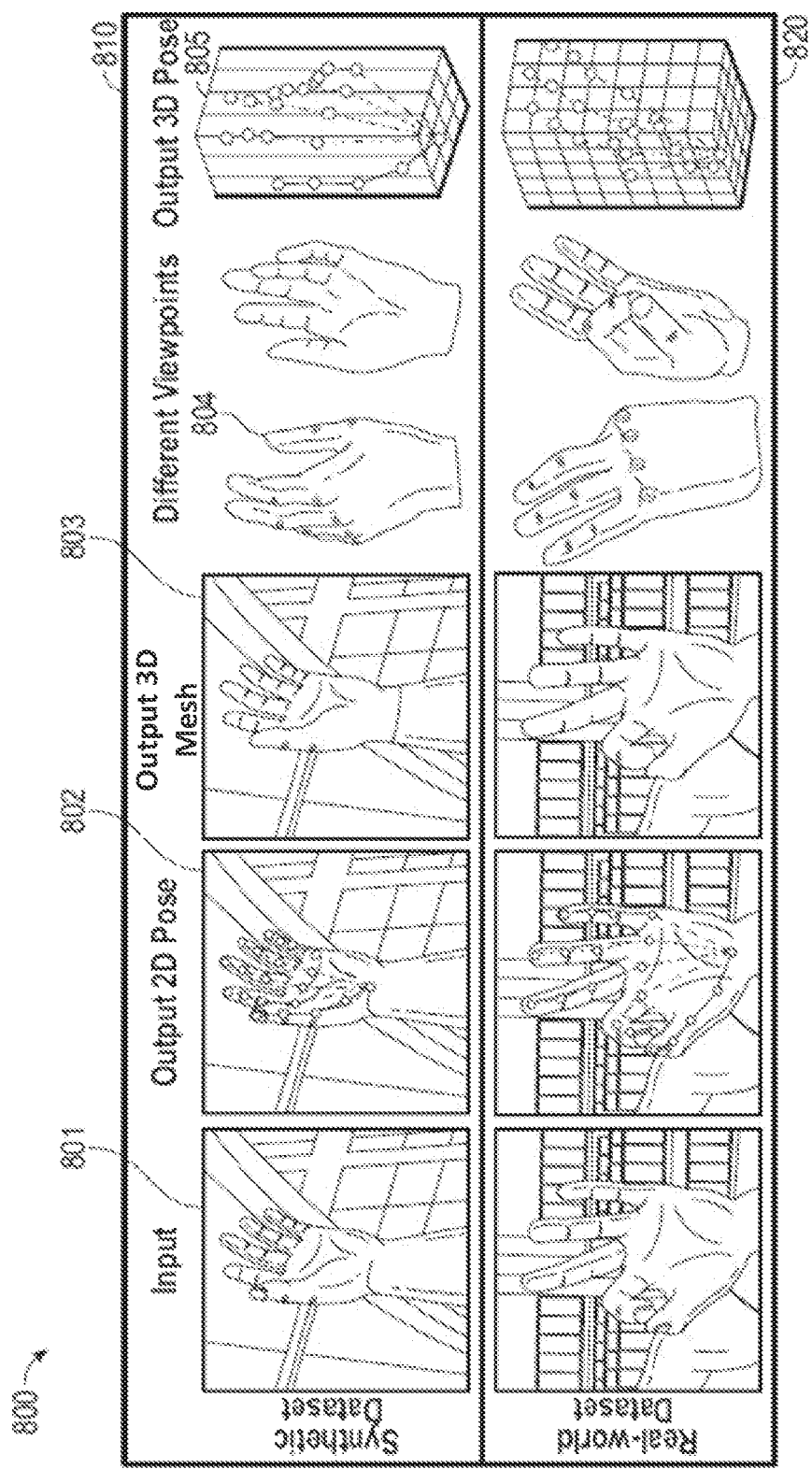
FIG. 8 is an illustrative input and output of the hand shape and pose estimation system, according to example embodiments.

An embodiment of the graph CNN module 418 is shown in FIG. 5. Particularly, the graph CNN module 418 generates 3D coordinates of vertices in the hand mesh and estimates the 3D hand pose from the mesh. In this way, the graph CNN module 418 models, based on features extracted by other machine learning technique modules of FIG. 5, a post of a hand depicted in a monocular image by adjusting skeletal joint positions of a 3D hand mesh and also models a shape of the hand in the monocular image by adjusting blend shape values of the 3D hand mesh representing surface features of the hand depicted in the monocular image. The resulting 3D hand mesh is then generated for display. An illustrative 3D mesh 803 with its different viewpoints 804 is shown in FIG. 8. A 3D mesh can be represented by an undirected graph:

$$\mathcal{M} = (\mathcal{V}, \mathcal{E}, W), \text{ where } \mathcal{V} = \{v_i\}_{i=1}^{N} \quad (4)$$

is the set of N vertices in the mesh, where according to Equations 5 and 6:

(5) $\mathcal{E} = \{e_i\}_{i=1}^{E}$ is a set of E edges in the mesh,
(6) $W = (w_{ij})_{N \times N}$ is the adjacency matrix, where $w_{ij}=0$ if $(i, j) \in \mathcal{E}$. The graph Laplacian is computed as L=D−W, where Equation 7:

$$D=\text{diag}(\Sigma_j w_{ij}) \quad (7)$$

is the diagonal degree matrix. The topology may be a triangular mesh that is fixed and is predefined by the hand mesh model (e.g., the adjacency matrix W and the graph Laplacian L of the graph M are fixed during training).

Given a signal, according to Equation 8:

$$f=(f_1, \ldots, f_N)^T \in \mathbb{R}^{N \times F} \quad (8)$$

on the vertices of graph M, F-dim features of N vertices are represented in the 3D mesh. The graph convolutional operation on the graph signal, according to Equation 9:

(9) $f_{in} \in \mathbb{R}^{N \times F_{in}}$ is defined as $$f_{out} = \sum_{k=0}^{K-1} T_k(\tilde{L}) \cdot f_{in} \cdot \theta_k,$$

where according to Equation 10:

$$T_k(x)=2xT_{k-1}(x)-T_{k-2}(x) \quad (10)$$

is a polynomial of degree k, $T_0=1$, $T_1=x$, $\tilde{L} \in \mathbb{R}^{N \times N}$ is the rescaled Laplacian, $\theta k \in \mathbb{R}^{F_{in} \times F_{out}}$ are the trainable parameters in the graph convolutional layer, $f_{out} \in \mathbb{R}^{N \times F_{om}}$ is the output graph signal of the graph CNN module 418.

In some embodiments, a hierarchical architecture for mesh generation is provided by performing graph convolution on graphs from coarse to fine, as shown in FIG. 5. The topologies of coarse graphs are precomputed by graph coarsening as shown in process 501 and are fixed during training. A multilevel clustering process is used to coarsen the graph and create a tree structure to store correspondences of vertices in graphs as adjacent coarsening levels. During the forward propagation, features of vertices 510 in the coarse graph are upsampled to corresponding children vertices 520 in the fine graph, as shown in process 502. The graph convolution is then performed to update features in the graph. All the graph convolutional filters have the same support of K=3. To make the network output independent of the camera intrinsic parameters, the network is configured to output UV coordinates on input image and depth vertices in the mesh, which can be converted to 3D coordinates in the camera coordinate system using the camera intrinsic matrix. Scale-invariant and root-relative depth of mesh vertices are estimated. Considering the 3D joint locations can be estimated directly from the 3D mesh vertices using a linear regressor, a simplified graph CNN can be implemented with two pooling layers and without nonlinear activation to linearly regress the scale-invariant and root-relative 3D hand joint locations from 3D coordinates of hand mesh vertices.

Referring back to FIG. 4, the output hand mesh that is estimated by the graph CNN module 418 is provided to hand mesh loss module 420. The hand mesh loss module 420 computes hand mesh loss by comparing the estimated hand mesh received from graph CNN module 418 with respect to the ground truth hand mesh (in the first training phase training), the pseudo-ground truth hand mesh (in the second training phase), or a precomputed and pretrained coefficient. The graph CNN module 418 is trained in a training phase based on the output of the hand mesh loss module 420. In an implementation, the hand mesh loss module 420 computes the hand mesh loss in accordance with Equation 11:

$$\mathcal{L}_{\mathcal{M}} = \lambda_v \mathcal{L}_v + \lambda_n \mathcal{L}_n + \lambda_e \mathcal{L}_e + \lambda_l \mathcal{L}_l \qquad (11)$$

which is composed of vertex loss $\mathcal{L}_v$, normal loss $\mathcal{L}_n$, edge loss $\mathcal{L}_e$, and Laplacian loss $\mathcal{L}_l$. The vertex loss $\mathcal{L}_v$ is to constrain 2D and 3D locations of mesh vertices according to Equation 12:

$$\mathcal{L}_v = \sum_{i=1}^{N} \|v_i^{3D} - \hat{v}_i^{3D}\|_2^2 + \|v_i^{2D} - \hat{v}_i^{2D}\|_2^2, \qquad (12)$$

where $v_i$ and $\hat{v}_i$ denote the ground truth and estimated 2D/3D locations of the mesh vertices, respectively. The normal loss $\mathcal{L}_n$ is to enforce surface normal consistency according to Equation 13:

$$\mathcal{L}_n = \sum_i \sum_{(i,j) \in t} \|\langle \hat{v}_i^{3D} - \hat{v}_j^{3D}, n_t \rangle\|_2^2, \qquad (13)$$

where t is the index of triangle faces in the mesh, (i,j) are the indices that compose one edge of triangle t, and $n_t$ is the ground truth normal vector of triangle face t. The edge loss $\mathcal{L}_e$ is introduced to enforce edge length consistency according to Equation 14:

$$\mathcal{L}_e = \Sigma_{i=1}^{E}(\|e_i\|_2^2 - \|\hat{e}_i\|_2^2)^2, \qquad (14)$$

where $e_i$ and $\hat{e}_i$ denote the ground truth and estimated edge vectors, respectively. The Laplacian loss $\mathcal{L}_l$ is introduced to preserve the local surface smoothness of the mesh according to Equation 15:

$$\mathcal{L}_l = \sum_{i=1}^{N} \|\delta_i - \Sigma_{n_k \in N(v_i)} \delta_k / B_i\|_2^2, \qquad (15)$$

where $\delta_i = v_i^{3D} - \hat{v}_i^{3D}$ is the offset from the estimation to the ground truth, $N(v_i)$ is the set of neighboring vertices of $v_i$, and $B_i$ is the number of vertices in the set $N(v_i)$. This loss function prevents the neighboring vertices from having opposite offsets, making the estimated 3D hand surface mesh smoother. In some implementations, $\lambda_v=1$, $\lambda_n=1$, $\lambda_e=1$, $\lambda_l=50$.

Pose regressor module 430 implements a regressor neural network (a machine learning technique) and is configured to process the hand mesh generated by graph CNN module 418 to generate a 3D pose graph. An illustrative pose graph 805 is shown in FIG. 8. The output 3D pose graph that is estimated by the pose regressor module 430 is provided to pose loss module 432. The pose loss module 432 computes a pose loss in accordance with Equation 16:

$$\mathcal{L}_{\mathcal{T}} = \sum_{j=1}^{J} \|\phi_j^{3D} - \hat{\phi}_j^{3D}\|_2^2, \qquad (16)$$

where $\phi_j^{3D}$ and $\hat{\phi}_j^{3D}$ are the ground truth and estimated 3D joint locations, respectively.

In some implementations, in a first training phase, synthetic hand training image data 402 is used to train the stacked hourglass network (e.g., first machine learning technique module 412) and the 3D pose regressor (e.g., another machine learning technique) separately with the heat-map loss module 414 and the 3D pose loss module 432, respectively. Subsequently, the stacked hourglass network, the residual network (e.g., the second machine learning technique module 416), and the graph CNN module 418 are trained for mesh generation with the combined loss function of Equation 17:

$$\mathcal{L}_{fully} = \lambda_{\mathcal{H}} \mathcal{L}_{\mathcal{H}} + \lambda_{\mathcal{M}} \mathcal{L}_{\mathcal{M}} + \lambda_{\mathcal{T}} \mathcal{L}_{\mathcal{T}}. \qquad (17)$$

In some implementations, $\lambda_{\mathcal{H}}=0.5$, $\lambda_{\mathcal{M}}=1$, $\lambda_{\mathcal{T}}=1$. Particularly, in the first training phase, each of the loss modules 414, 420 and 432 is provided with ground truth information corresponding to a given image from synthetic hand training image data 402 being processed. The first machine learning technique module 412 processes the given image from synthetic hand training image data 402 to generate an estimated heat map from the image, the graph CNN module 418 processes the given image to estimate a hand mesh, and the pose regressor module 430 processes the given image to estimate a 3D pose graph. Each of these networks is trained to minimize the corresponding loss of loss modules 414, 420 and 432.

After the networks are trained in the first training phase, in a second training phase, real hand training image data 403 is used to train the machine learning techniques network 410. Specifically, the networks are fine-tuned in a weakly-supervised manner. In some implementations, the networks are trained without the ground truth of 3D joint locations. A reference depth map is leveraged corresponding to the received images depicting the real-world hand to employ a differentiable renderer to render the estimated 3D hand mesh to a depth map from the camera viewpoint. This is the function of hand mesh rendering module 440. The output of the hand mesh rendering module 440 is provided to depth map loss module 450 to compare to the ground truth depth map. Specifically, the smooth L1 loss is used for the depth map loss, which is computed in accordance with Equation 20:

$$\mathcal{L}_{\mathcal{D}} = \text{smooth}_{L1}(D, \hat{D}), \; \hat{D} = \mathcal{R}(\hat{\mathcal{M}}), \qquad (20)$$

where $\mathcal{D}$ and $\hat{\mathcal{D}}$ denote the ground truth and the rendered depth maps, respectively. $\mathcal{R}(\cdot)$ is the depth rendering function; and $\hat{\mathcal{M}}$ is the estimated 3D hand mesh. In some implementations, the resolution of the depth map is 32×32 pixels.

In some cases, training in the second phase with only the depth map loss could lead to a degenerate solution since the depth map loss only constrains the visible surface and is sensitive to the noise in the captured depth map. To address this issue, a pseudo-ground truth mesh $\hat{\mathcal{M}}$ is created using the pretrained models from the first phase and the ground truth heat maps. The pseudo-ground truth mesh $\hat{\mathcal{M}}$ has a reasonable edge length and good surface smoothness. In an implementation, an edge loss $\mathcal{L}_e$ is adopted and Laplacian loss $\mathcal{L}_l$ as the pseudo-ground truth mesh loss according to Equation 21:

$$\mathcal{L}_{\hat{\mathcal{M}}} = \lambda_e \mathcal{L}_e + \lambda_l \mathcal{L}_l, \text{ where } \lambda_e = 1, \lambda_l = 50. \quad (21)$$

in order to preserve the edge length and surface smoothness of the mesh. Specifically, this mesh loss is used by the hand mesh loss module 420 in the second training phase. With the supervision of the pseudo-ground truth meshes, the network can generate meshes with correct shape and smooth surface. In an implementation, in the second training phase, the stacked hourglass network (e.g., first machine learning technique module 412) is fine-tuned first with the heat-map loss and then all the networks are fine-tuned with the combined loss according to Equation 22:

$$\mathcal{L}_{weakly} = \lambda_H \mathcal{L}_H + \lambda_D \mathcal{L}_D + \lambda_{PM} \mathcal{L}_{PM}, \quad (22)$$

where $\lambda_H = 1$, $\lambda_D = 0.1$, $\lambda_{PM} = 1$. In some embodiments, this loss function is performed on the dataset without 3D pose supervision. In some embodiments, when the ground truth of 3D joint locations is provided during training, the 3D pose loss $\mathcal{L}_J$ is added to the loss $\mathcal{L}_{weakly}$ function and the weight is set as $\lambda_J = 10$.

Figure 6:
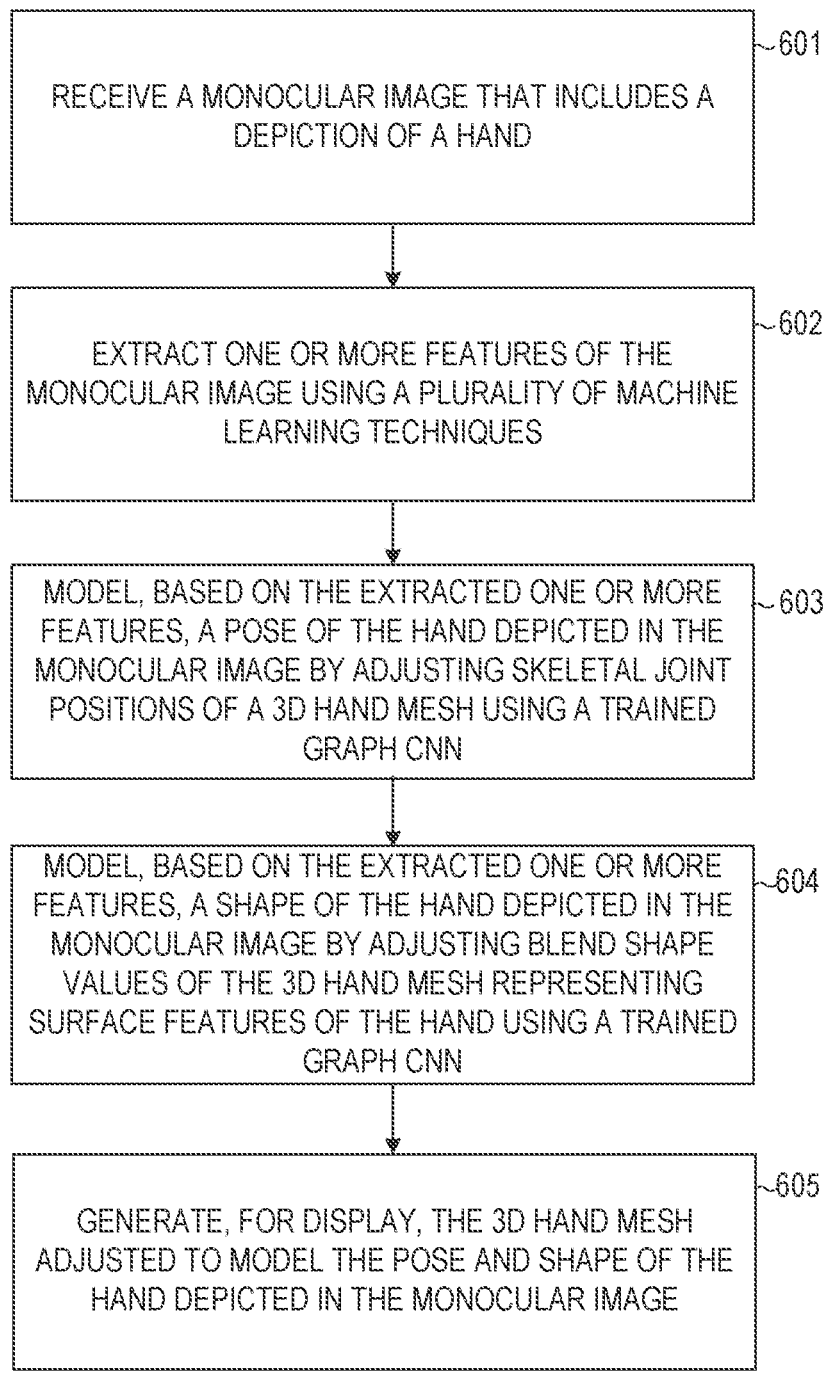
FIGS. 6-7 are flowcharts illustrating example operations of the hand shape and pose estimation system, according to example embodiments.
Figure 7:
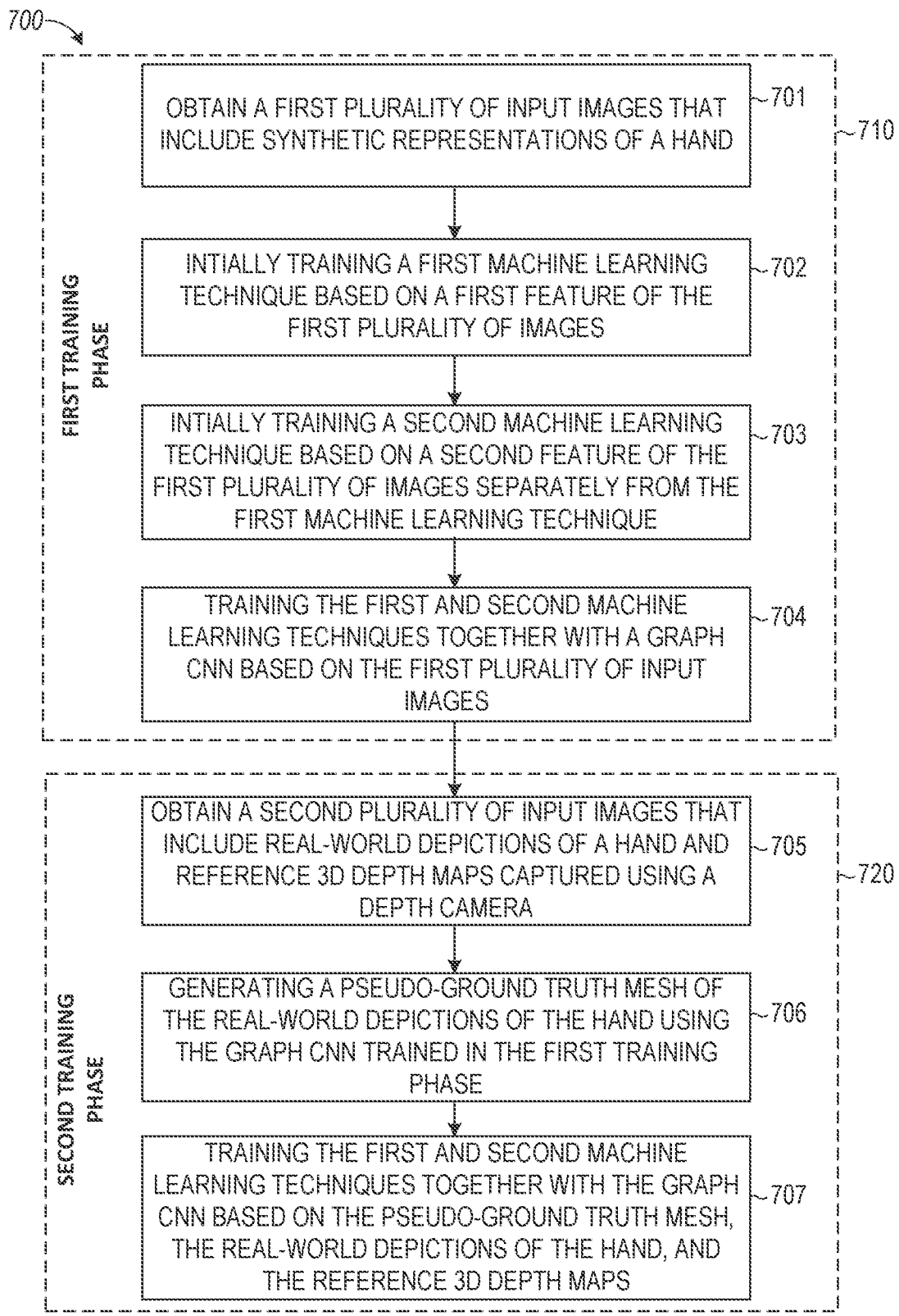

FIGS. 6-7 are flowcharts illustrating example operations of the hand shape and pose estimation system 124 in performing processes 600-700, according to example embodiments. The processes 600-700 may be embodied in computer-readable instructions for execution by one or more processors such that the operations of the processes 600-700 may be performed in part or in whole by the functional components of the messaging server system 108 and/or AR/VR application 105; accordingly, the processes 600-700 are described below by way of example with reference thereto. However, in other embodiments, at least some of the operations of the processes 600-700 may be deployed on various other hardware configurations. The processes 600-700 are therefore not intended to be limited to the messaging server system 108 and can be implemented in whole, or in part, by any other component.

At operation 601, the hand shape and pose estimation system 124 receives a monocular image that includes a depiction of a hand. For example, a trained machine learning techniques network 410 receives, from a client device 102, an RGB image of a user's hand. This information is received and processed as monocular image depicting a hand 401.

At operation 602, the hand shape and pose estimation system 124 extracts one or more features of the monocular image using a plurality of machine learning techniques. For example, the first machine learning technique module 412 estimates a heat map of the image, a second machine learning technique module 416 encodes the estimated heat map and image feature maps using a residual network, and a pose regressor module 430 estimates a 3D pose graph from a mesh representing the hand depicted in the image. At operation 603, the hand shape and pose estimation system 124 models, based on the extracted one or more features, a pose of the hand depicted in the monocular image by adjusting skeletal joint positions of a 3D hand mesh using a trained graph CNN. For example, the graph CNN module 418 generates a 3D hand mesh using the heat map estimated by the first machine learning technique module 412 which identifies skeletal joint positions. To do this, graph CNN module 418 receives latent features from the second machine learning technique module 416 and performs graph convolutional operations in accordance with Equation 9 to adjust skeletal joint positions of the 3D hand mesh.

At operation 604, the hand shape and pose estimation system 124 models, based on the extracted one or more features, a shape of the hand depicted in the monocular image by adjusting blend shape values of the 3D hand mesh representing surface features of the hand using a trained graph CNN. For example, the graph CNN module 418 infers the 3D coordinates of the 3D hand mesh and linearly regresses the 3D hand joint locations from the reconstructed 3D hand mesh vertices.

At operation 605, the hand shape and pose estimation system 124 generates, for display, the 3D hand mesh adjusted to model the pose and shape of the hand depicted in the monocular image. For example, a 3D mesh 803 (FIG. 8) is adjusted to model the pose (e.g., using 3D pose graph 805) and shape of a hand depicted in given hand training image data 801. This 3D mesh 803 and 3D pose graph 805 are returned to client device 102 for presentation in the AR/VR application 105.

FIG. 7 illustrates a process 700 for training one or more machine learning techniques to generate a 3D hand mesh representing the pose and shape of a hand depicted in a monocular image (e.g., an RGB image). The process 700 includes a set of operations performed in a first training phase 710 and a set of operations performed in a second training phase 720 that follows the first training phase 710.

At operation 701, the hand shape and pose estimation system 124 obtains a first plurality of input images that include synthetic representations of a hand. For example, machine learning techniques network 410 initially receives synthetic hand training image data 402. An illustrative synthetic hand training image data 801 and its corresponding output is shown in a first row 810 of FIG. 8.

At operation 702, the hand shape and pose estimation system 124 initially trains a first machine learning technique based on a first attribute of the first plurality of images. For example, for a given image from the synthetic hand training image data 402, ground truth heat map information is obtained and provided to heat map loss module 414. The first machine learning technique module 412 estimates a heat map for the given image (e.g., using a stacked hourglass network) and is trained to minimize the loss computed by heat map loss module 414.

At operation 703, the hand shape and pose estimation system 124 initially trains a second machine learning technique based on a second feature of the first plurality of images separately from training the first machine learning technique. For example, for a given image from the synthetic hand training image data 402, ground truth pose information is obtained and provided to pose loss module 432. The pose regressor module 430 estimates a pose for the given image (e.g., using a differentiable renderer network) and is trained to minimize the loss computed by pose loss module 432.

At operation 704, the hand shape and pose estimation system 124 trains the first and second machine learning techniques together with a graph CNN based on the first plurality of input images. For example, for a given image from the synthetic hand training image data 402, ground truth hand mesh information is obtained and provided to hand mesh loss module 420. The graph CNN module 418 estimates a hand mesh for the given image and is trained to minimize the loss computed by hand mesh loss module 420. The machine learning techniques network 410 are trained to minimize the loss together in accordance with Equation 17.

At operation 705, the hand shape and pose estimation system 124 obtains a second plurality of input images that include real-world depictions of a hand and reference 3D depth maps captured using a depth camera. For example, machine learning techniques network 410 receives real hand training image data 403. An illustrative synthetic hand training image data 801 and its corresponding output is shown in a second row 820 of FIG. 8.

At operation 706, the hand shape and pose estimation system 124 generates a pseudo-ground truth mesh of the real-world depictions of the hand using the graph CNN trained in the first training phase. For example, a pseudo-ground truth mesh $\hat{M}$ is created using the pretrained models from the first training phase and the ground truth heat-maps of the real hand training image data 403.

At operation 707, the hand shape and pose estimation system 124 trains the first and second machine learning techniques together with the graph CNN based on the pseudo-ground truth mesh, the real-world depictions of the hand, and the reference 3D depth maps. For example, the machine learning techniques network 410 are trained to minimize the loss together in accordance with Equation 22 or also considering 3D pose loss $\mathcal{L}_J$.

As discussed above, FIG. 8 provides example outputs of the hand shape and pose estimation system 124 as applied to synthetic data shown in row 810 and as applied to real-world data shown in row 820. Specifically, the hand shape and pose estimation system 124 generates an output 2D post 802 (e.g., using first machine learning technique module 412) given corresponding to the input data, an output 3D mesh 803 (e.g., using graph CNN module 418), and an output 3D pose graph 805 (e.g., using pose regressor module 430).

Figure 9:
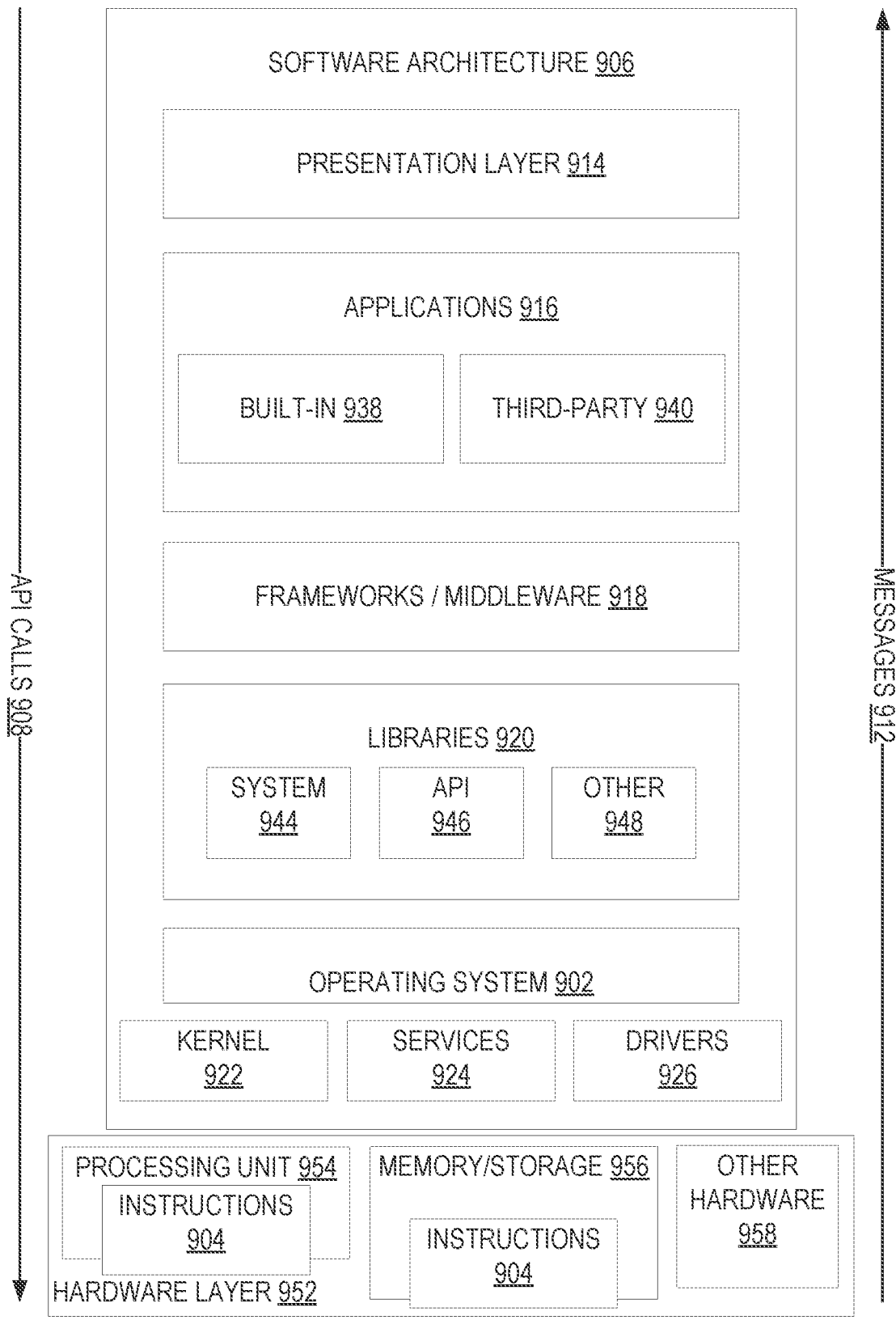
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
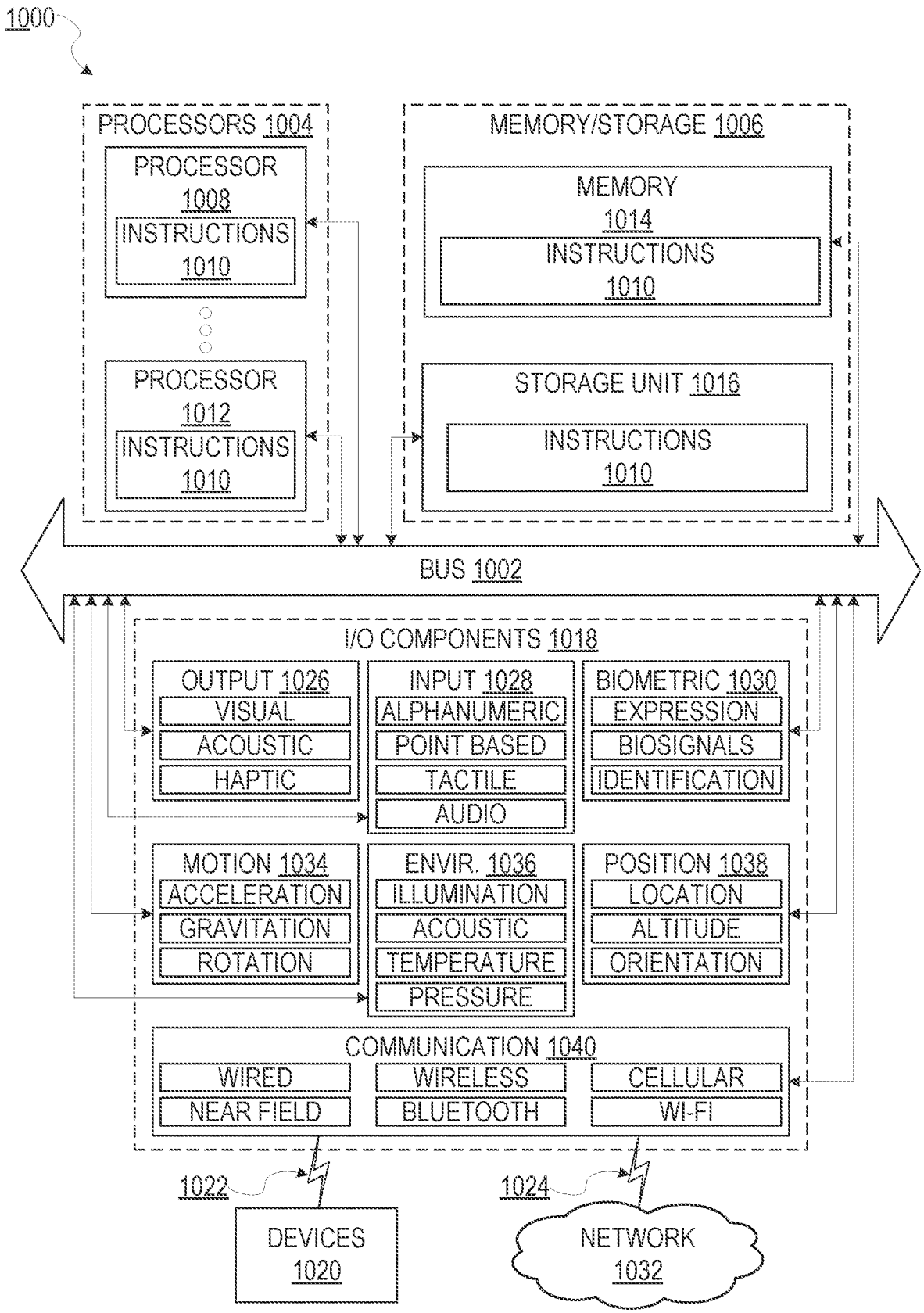
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.
Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   obtaining a first plurality of images that include respective representations of a hand, one or more of the representations of the hand comprising a synthetic representation of the hand;
   obtaining a second plurality of images that include real-world depictions of a hand and reference three-dimensional (3D) depth maps;
   generating a pseudo-ground truth mesh of each of the real-world depictions of the hand using a trained graph convolutional neural network (CNN);
   training a first machine learning technique based on a first feature of the first plurality of images;
   training a second machine learning technique based on a second feature of the first plurality of images separately from the first machine learning technique; and
   generating a 3D hand mesh by applying the trained first and second machine learning techniques and the trained graph CNN to one or more monocular images.

2. The method of claim 1, wherein the synthetic representation of the hand comprises a graphical representation of the hand further, further comprising:
   training the first and second machine learning techniques together with the graph CNN based on the first plurality of images.

3. The method of claim 2, further comprising:
   based on the first and second machine learning techniques, continuously changing an appearance of a 3D hand mesh by continuously capturing new monocular images of the hand in different positions, wherein the appearance of the 3D hand mesh changes to resemble the different positions of the hand as the hand changes from one position to another position.

4. The method of claim 1, further comprising training the first and second machine learning techniques together with the trained graph CNN based on the pseudo-ground truth mesh of each of the real-world depictions of the hand, the second plurality of images of the real-world depictions of a hand and reference 3D depth maps.

5. The method of claim 1, further comprising:
   receiving a given monocular image that includes a depiction of a hand; and
   modeling a pose of the hand depicted in the given monocular image by adjusting skeletal joint positions of a 3D hand mesh by estimating 3D coordinates of vertices in the 3D hand mesh using the trained graph CNN.

6. The method of claim 5, further comprising:
   linearly regressing the joint positions using a linear graph CNN; and
   generating, for display, the 3D hand mesh adjusted to model the pose of the hand depicted in the given monocular image.

7. The method of claim 1, further comprising:
   applying the first machine learning technique to a given monocular image to estimate a two-dimensional (2D) heat map of the hand in the given monocular image and to generate an image feature map; and
   encoding a 2D heat map and the image feature map using the second machine learning technique to generate a feature vector.

8. The method of claim 1, wherein the first machine learning technique comprises a stacked hourglass network, and wherein the second machine learning technique comprises a residual network.

9. The method of claim 1 further comprising:
   modeling based on one or more extracted features of a given monocular image, a shape of the hand in the given monocular image by adjusting blend shape values of a 3D hand mesh representing surface features of the hand depicted in the given monocular image using the trained graph CNN.

10. The method of claim 1, further comprising generating an image of the first plurality of images by:
    generating a 3D hand model by combining a plurality of hand joints with a plurality of surface textures; and
    combining the generated hand model with a background image.

11. The method of claim 10, further comprising:
    randomly selecting a hand pose from a plurality of hand poses;
    adjusting the plurality of hand joints based on the selected hand pose; and
    adjusting the plurality of surface textures by applying random weights to blend shapes and ratios.

12. The method of claim 10, wherein generating the 3D hand model comprises:
    obtaining a 3D hand model that includes a first level of coarseness having a first number of vertices;
    applying the trained graph CNN to the first level of coarseness;
    upsampling the obtained 3D hand model to increase the level of coarseness to a second level of coarseness having a second number of vertices greater than the first number of vertices;
    generating a tree structure representing correspondences of vertices in the first and second levels of coarseness; and
    updating the trained graph CNN based on the upsampled 3D hand model and the generated tree structure.

13. The method of claim 1, further comprising:
    training the first machine learning technique based on a heat map loss function and training the second machine learning technique based on a 3D pose loss function, and the first and second machine learning techniques are trained together with the graph CNN by training the first and second machine learning techniques together based on the heat map loss function, the 3D pose loss function, and a mesh loss function.

14. The method of claim 1, further comprising:
    training the first and second machine learning techniques and the trained graph CNN based on the generated pseudo-ground truth mesh, the real-world depictions of the hand, and the reference 3D depth maps of the real-world depictions of the hand.

15. The method of claim 1, further comprising:
    modeling, based on one or more extracted features of a given monocular image, a shape of the hand in the given monocular image by adjusting blend shape values of a 3D hand mesh representing surface features of the hand depicted in the given monocular image using the trained graph CNN.

16. A system comprising:
a processor configured to perform operations comprising:
obtaining a first plurality of images that include respective representations of a hand, one or more of the representations of the hand comprising a synthetic representation of the hand;
obtaining a second plurality of images that include real-world depictions of a hand and reference three-dimensional (3D) depth maps;
generating a pseudo-ground truth mesh of each of the real-world depictions of the hand using a trained graph convolutional neural network (CNN);
training a first machine learning technique based on a first feature of the first plurality of images;
training a second machine learning technique based on a second feature of the first plurality of images separately from the first machine learning technique; and
generating a 3D hand mesh by applying the trained first and second machine learning techniques and the trained graph CNN to one or more monocular images.

17. The system of claim 16, wherein the operations further comprise:
modeling, based on one or more extracted features of a given monocular image, a shape of the hand in the given monocular image by adjusting blend shape values of a 3D hand mesh representing surface features of the hand depicted in the given monocular image using the trained graph CNN.

18. The system of claim 16, wherein the first machine learning technique comprises a stacked hourglass network, and wherein the second machine learning technique comprises a residual network.

19. A non-transitory machine-readable storage medium that includes instructions that, when executed by one or more processors of a machine, cause the machine to perform operations comprising:
obtaining a first plurality of images that include respective representations of a hand, one or more of the representations of the hand comprising a synthetic representation of the hand;
obtaining a second plurality of images that include real-world depictions of a hand and reference three-dimensional (3D) depth maps;
generating a pseudo-ground truth mesh of each of the real-world depictions of the hand using a trained graph convolutional neural network (CNN);
training a first machine learning technique based on a first feature of the first plurality of images;
training a second machine learning technique based on a second feature of the first plurality of images separately from the first machine learning technique; and
generating a 3D hand mesh by applying the trained first and second machine learning techniques and the trained graph CNN to one or more monocular images.

20. The non-transitory machine-readable storage medium of claim 19, wherein the operations further comprise:
modeling, based on one or more extracted features of a given monocular image, a shape of the hand in the given monocular image by adjusting blend shape values of a 3D hand mesh representing surface features of the hand depicted in the given monocular image using the trained graph CNN.

* * * * *